Feb. 20, 1951

R. L. SANDERS 2,542,579

CONNECTOR

Filed March 22, 1945

INVENTOR.
RAY L. SANDERS

BY J. D. Douglas
ATTORNEY

Patented Feb. 20, 1951

2,542,579

UNITED STATES PATENT OFFICE 2,542,579

CONNECTOR

Ray L. Sanders, Deerfield, Ill., assignor to Admiral Corporation, Chicago, Ill., a corporation of Delaware Application March 22, 1945, Serial No. 584,205

3 Claims. (Cl. 171—242)

This invention relates to improvements in connectors and more particularly for a connector useful in connecting a control member to a tuning member such as in permeability tuning controls for radio receivers.

As is well known to those well versed in the art, radio receivers may be tuned by varying the inductance or capacity of a circuit. When the capacity is varied it is usually effected by moving the plates of a condenser. When the inductance is varied, it is commonly done by moving a slug, composed of finely divided iron particles held together with an insulating binder, which slug is known as a permeability tuning slug, into and out of the field of the inductance coil in the circuit. Although the invention about to be described is particularly useful for so called slug tuning, it will be apparent that it is also useful in other places such as where the condensers are of the cylindrical or tubular type.

In slug tuning or permeability tuning, there are usually provided a plurality of coils which are wound on forms, and the slugs are usually inserted or withdrawn from the forms and their associated coils simultaneously. The number of forms varies, depending upon the kind and complexity of the circuit, the minimum number usually being two. In many instances, however, the number of forms may be increased depending upon the particular circuit involved. When more than one inductance element has to be tuned, it is common practice to mount the elements in spaced parallel relation upon a suitable support and to secure the slugs to a common control member in such a manner that they may be simultaneously projected into or withdrawn from the coils. As they are moved into the coils, the inductance is increased, and as they are withdrawn from the coils, the inductance is lowered. Furthermore, it is necessary that in order that the circuits may be properly aligned with each other that the slugs be provided with individual adjustments so that each individual slug may be made to enter its proper coil at the right time in accordance with the entry of the other slugs into their respective coils. All of this is well known in practice.

One of the problems in connection with permeability tuning has been that since the coils are mounted usually perpendicularly to their mount and in parallel relation to each other, it is desirable to provide a means whereby the slugs may be more readily aligned with the coils. This does not present a very serious problem where expensive precision controls are used. In production, however, it is desirable to cut expenses in all manners possible and, therefore, it is not desirable to use precision controls but preferable to use controls which may be put together quickly and which will enable the slugs to enter into the coils easily. In such devices there are usually slight misalignments of the coils. If the slugs are fastened rigidly to the support which moves them in and out of the coils having such misalignment, the slugs bind in the coils and difficulty is experienced in the operation thereof. If, however, the slugs are flexibly mounted to the movable member, then the alignment becomes much easier and certain tolerances as to placement of the slug controls are allowable which otherwise would not be permissible.

In the present invention, I have provided a slug support which is extremely cheap and simple to manufacture. The slug is adjustable in the control member and a certain amount of flexibility is present which allows the slug to tilt or be guided into its proper position for best entry into or withdrawal from the inductance.

Other advantages of the invention and the invention itself will become more apparent from the following description of an embodiment thereof, which description is illustrated by the accompanying drawings and forms a part of this specification.

In carrying out my invention, I preferably provide the control member which is movable to control the positions of the slug and which is provided with means for receiving a flexible member that is adjustable therein and from which a flexible stem extends, the end being secured into the slug.

Figures 1, 3:
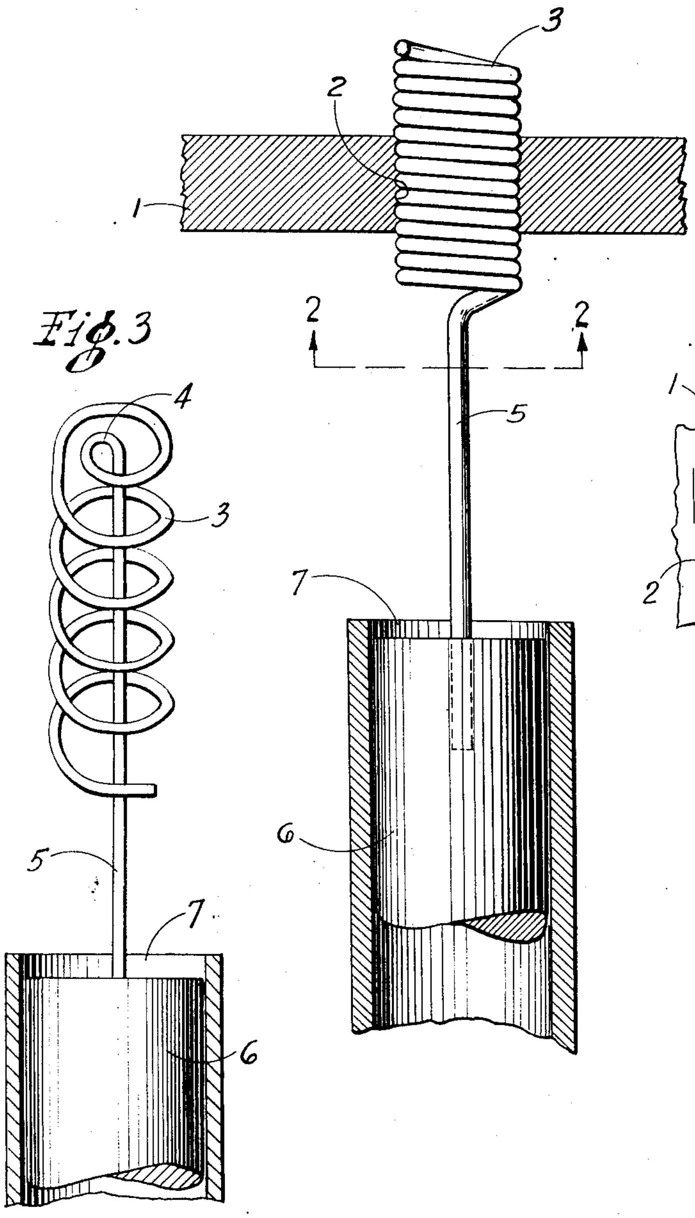
Fig. 1 is an elevational view of the connector of my invention showing in section the control support and the coil or inductance support and in fragment the tuning slug.
Fig. 3 is an elevational view of a modified form of the invention.

Referring to the drawings throughout which like parts have been designated by like reference characters and more particularly to Fig. 1. The support or control member is illustrated at 1.

The control member 1 is preferably formed with an opening having a spiral groove 2 formed in any suitable manner such as by tapping. Although I have stated that the member may have the opening tapped, it will be quite clear that it can be larger and provided with a separate element which is suitable to engage the convolutions of the body later to be described and that it is not necessary that the opening be threaded. For instance, a pal-nut could be used in conjunction with a larger opening if desired or other similar expedients could be used. The connector preferably comprises a wire like body indicated at 3 which is wound in the form of a helix, the convolutions of which lie adjacent to each other. Although they are shown lying adjacent to each other, it is quite within the purview of my invention to have the convolutions spaced. In some instances it may be desirable to space the convolutions to provide greater flexibility thereto. This is shown in Fig. 3.

Figure 2:
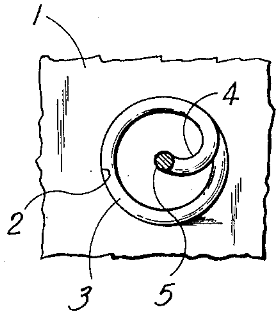
Fig. 2 is a section taken on the line 2—2 of Fig. 1.

The body member is adapted to be engaged in the opening 2 by threading the same therein. The last convolution of the body extends over to a position coaxial with the center of the coil 3 as is indicated at 4 in Fig. 2 and is provided with a stem 5, as indicated in Figs. 1 and 2, which stem is coaxial with the body. It is preferable that the stem be coaxial with the body in order that when adjustment of the body in the member 1 is effected by rotating the body, the axis of the rotation of the member 5 will not change.

Secured to the end of the stem 5, preferably during the manufacturing thereof, is the permeability tuning slug indicated at 6. The slug is adapted to enter into the coil form 7, which is shown in Fig. 1. The inductance winding is not shown on the form, but as is well known to those versed in the art, it can take any one of many various forms. In one particular receiver there may be several forms.

Referring now to Fig. 3, it will be noted that in this case the body 3 is formed in substantially the same manner as previously described, except that the convolutions are spaced apart. The part 4 in this case is disposed at the top and extends toward the center of the coil at the top of the coil instead of at the bottom of the coil; the stem 5 then extends downward through the coil coaxial therewith. The end of the stem projects beyond the confines of the coil and is secured to the slug 6 in the same manner as that previously described. Although I have shown the convolutions spaced apart, it will be apparent that they may be formed in the same manner as that of Fig. 1 if desired.

As previously stated, the body itself is flexible because it is wound of a piece of wire in the form of a spring, and the stem 5 is also flexible. This permits the slug to move laterally a certain amount which enables it to align itself readily with the coil form without placing any undue strain on either the slug or the form.

In the case of Fig. 3, additional flexibility is provided because the stem 5, which extends upward through the coil form, has additional length without making the connector unduly long.

Preferably, the element comprising the parts 3 and 5 is formed prior to molding into the slug itself. When the slug is molded, the end of the part 5 may be molded directly into the slug. It will be understood, however, that the connector may be made independently of the slug and secured to the slug in any desired manner such as by cementing into the slug or in any other manner well known to those versed in the art.

It will appear, therefore, that I have provided a connector which is extremely cheap in construction, adapts itself readily to connection with the slug during manufacture, is readily adjustable to provide fine tuning of the slug and independent tuning during manufacture of a receiver.

Because of its construction, it provides sufficient stiffness to enable the slug to be projected by the control member into or out of the inductance support and still allow sufficient flexibility for the slugs to be substantially self aligning with the coils should the supports not be aligned or coaxial with the opening for the body 3. This thus permits greater ease of operation. It will appear that this is particularly desirable since the tolerance or clearance for the slug 6 with the coil form 7 must be kept at a minimum in order that vibrations within the receiver will not cause the inductance to change and that when this clearance is so kept, then any slight misalignment of the form with the slug is very apt to cause binding and render the device inoperative.

Having thus described the invention, I am aware that numerous and extensive departures may be made therefrom without departing from the spirit or scope of the invention.

I claim:

1. A tuning element connector comprising a body formed of wire or the like into a helix and a continuation of said helix forming member extending coaxially through the helix and protruding beyond the end of the helix.

2. A tuning element connector for connecting a tuning element to a tuning control including a wire wound to form a helix having closely disposed turns, the end of said wire extending from one end of the helix coaxially therethrough beyond the other end of the helix and adapted to be secured to a tuning element.

3. In combination with a movable member and a member to be moved thereby, a connector for connecting the member to be moved to the movable member comprising a body portion formed of wire having spaced helical convolutions adapted to be adjustably secured to the movable member, one end of said body having a stem extending therefrom and extending through the helix adapted to be connected to the member to be moved.

RAY L. SANDERS.

REFERENCES CITED

The following references are of record in the file of this patent:

UNITED STATES PATENTS

| Number | Name | Date |
|---|---|---|
| 749,869 | Lewis | Jan. 19, 1904 |
| 1,896,995 | Bagnall | Feb. 7, 1933 |
| 2,240,087 | Barrett | Apr. 29, 1941 |
| 2,255,680 | Sands | Sept. 9, 1941 |
| 2,270,117 | Fill | Jan. 13, 1942 |
| 2,338,134 | Sands et al. | Jan. 4, 1944 |
| 2,361,395 | Gilligan | Oct. 31, 1944 |
| 2,423,275 | Wandrey | July 1, 1947 |